United States Patent
Chaffee et al.

(10) Patent No.: US 10,677,758 B2
(45) Date of Patent: Jun. 9, 2020

(54) SYSTEM AND METHOD FOR DETECTING MULTIPLE FRAGMENTS IN A TARGET MISSILE

(71) Applicant: Invocon, Inc., Conroe, TX (US)

(72) Inventors: Donald L. Chaffee, Malabar, FL (US); Douglas A. Heermann, Conroe, TX (US); Brian D. Philpot, Spring, TX (US)

(73) Assignee: Invocon, Inc., Conroe, TX (US)

( * ) Notice: Subject to any disclaimer, the term of this patent is extended or adjusted under 35 U.S.C. 154(b) by 340 days.

(21) Appl. No.: 15/729,239

(22) Filed: Oct. 10, 2017

(65) Prior Publication Data
US 2018/0113095 A1    Apr. 26, 2018

Related U.S. Application Data

(60) Provisional application No. 62/407,463, filed on Oct. 12, 2016.

(51) Int. Cl.
*G01N 29/04* (2006.01)
*F41G 7/00* (2006.01)
(Continued)

(52) U.S. Cl.
CPC ............. *G01N 29/04* (2013.01); *F41G 7/001* (2013.01); *F41G 7/007* (2013.01); *F41G 7/224* (2013.01);
(Continued)

(58) Field of Classification Search
CPC ......... G01L 5/14; F42B 35/00; G01N 29/045; G01N 29/09; G01N 29/4472; F41J 5/06; F41G 7/224
See application file for complete search history.

(56) References Cited

U.S. PATENT DOCUMENTS 5,322,016 A * 6/1994 Toth ..................... F42C 13/047
                                                                102/211
8,279,425 B1    10/2012 Heermann et al.
(Continued)

FOREIGN PATENT DOCUMENTS

DE        3843601 A1 *  6/1990  ................ F41J 5/06

*Primary Examiner* — Mischita L Henson
(74) *Attorney, Agent, or Firm* — Shannon Warren

(57) ABSTRACT

A system and method is provided for detecting the trajectory of multiple fragments through a conic or cylindrical section, such as the body of a missile. Three or more sensors are placed on the on the body of the object. Each of the sensors is constructed and arranged to measure signals to the sensor at from impacts on one or more locations on the body. The sensor then transmits a signal commiserate with the impact of a fragment thereon. A computer system is also provided to perform necessary calculations and, potentially, record the impact times and locations. When the body of the object is hit by fragments or shrapnel, a signal from one or more of the sensors is sent to the computer system. This operation is performed and constantly updated for all locations where a fragment is detected by one or more of the sensors. Waveforms of the impacts are recorded, but because multiple hits can occur, there can be superposition (or destruction) of the resulting waveform sent to the computer system. The computer system can interpret which superposition or destruction is indicative of another fragment strike, and filter out those additions or subtractions to the waveforms that could not possibly be from another fragment.

10 Claims, 11 Drawing Sheets

(51) Int. Cl.
*G01L 5/14* (2006.01)
*F41G 7/22* (2006.01)
*G01N 29/09* (2006.01)
*F42B 35/00* (2006.01)
*G01N 29/44* (2006.01)
*F41J 5/06* (2006.01)
*F42B 12/22* (2006.01)

(52) U.S. Cl.
CPC .............. *F41J 5/06* (2013.01); *F42B 35/00* (2013.01); *G01L 5/14* (2013.01); *G01N 29/045* (2013.01); *G01N 29/09* (2013.01); *G01N 29/4472* (2013.01); *F42B 12/22* (2013.01)

(56) References Cited

U.S. PATENT DOCUMENTS

| | | |
|---|---|---|
| 8,307,694 B1 | 11/2012 | Kiefer et al. |
| 8,316,690 B1 | 11/2012 | Kiefer et al. |
| 9,354,136 B1 * | 5/2016 | Philpot ............... G01M 5/0066 |

* cited by examiner

SYSTEM AND METHOD FOR DETECTING MULTIPLE FRAGMENTS IN A TARGET MISSILE

CROSS-REFERENCE TO RELATED APPLICATIONS

This application is a conversion of U.S. Provisional Patent Application No. 62/407,463 with the same title and from the same inventors as the present application, the aforesaid provisional application having been filed on Oct. 12, 2016, and which is incorporated herein by reference for all purposes.

STATEMENT REGARDING FEDERALLY SPONSORED RESEARCH

This invention was not funded or sponsored by the federal government.

BACKGROUND OF THE INVENTION

1. Field of the Invention

The present invention relates to anti-ballistic missiles. More specifically, the present invention relates to a method and system for detecting when fragments emanating from an anti-ballistic missile strikes a target missile in order to determine the effectiveness of the anti-ballistic missile.

2. Description of the Related Art

The Department of Defense (DOD) of the U.S. government has developed anti missile technology to protect the United States and allied interests against attack by different threat missiles. Threats may be ballistic in nature. That is, they are carried outside of the atmosphere by a rocket to extend the range of the weapon and subsequently re-enter the atmosphere and are guided to their intended target by external commands or internal guidance logic. Other threats may fly close to the earth to avoid radar and other short range defense systems via speed and maneuverability at "map of the earth" altitudes.

Defensive missiles have been designed as "hit-to-kill" weapons where a kinetic warhead (KW) on the killer (defensive) missile acquires the target threat and is guided to that target via external inputs as well as internal sensors and logic. This technique is adequate for many types of threat missiles. However, new threats may require a different approach to the "end game" kill scenario. This new technology is referred to as a "shrapnel kill" weapon. It is to missiles as a shot gun is to a goose hunter. The killing mechanism is not a simple one-piece kinetic warhead (KW); but, instead, it explodes into many shrapnel fragments when sensors indicate it is close enough to the target. The shrapnel fragments maintain the forward velocity of the killer missile as well as the additive acceleration and final velocity provided by the fragmenting explosive. This process is similar to a WW2 technology for hand grenades.

"Hit to Kill" weapons have been judged for their accuracy by lethality assessment systems that are installed and flown within the payloads of the "threat representative" target missiles. Historically, most impact and lethality assessment systems and methods for determining the impact point and damage propagation in a detection surface, such as ballistic missile intercepts, micrometeoroids and orbital debris (MMOD) or other shock events typically utilize wire or optical grids that form a mesh over the surface of the target missile. These grid systems report the initial hit point by monitoring the X/Y matrix of the grid and accurately determine the timing and sequence of broken conduction paths. This data is compiled and transmitted off of the target missile very quickly so as to avoid inevitable destruction of the target by the killer missile.

The conventional lethality assessment capability is dependent upon the X/Y grids created by the optical or wire conductors. This technique works well for "Hit to Kill" weapons since there will only be one impact. However, in a "Shrapnel Kill" environment, each target missile may take many hits from the shrapnel generated from the explosion of the warhead from the kill vehicle. Conventional wire/optical grids ignore a wire or optical path when it is broken rendering it useless, thus, it is impossible utilizing current lethality assessment methods to accurately record multiple random hits from shrapnel on a grid because once a path is broken by one hit, future hits, involving that conductive path, are not detected and, as a result, would create incorrect tabulation of the multiple hits from the shrapnel kill vehicle.

Invocon, Inc., of Conroe, Tex. has developed and patented several lethality assessment systems that employ a "wireless hit grid" that utilizes impact energy to locate the exact point of initial contact and damage propagation in the detection surface. The following are some examples.

Heermann et al, U.S. Pat. No. 8,279,425, assigned to Invocon, Inc., commonly owned with the present application, and incorporated herein by reference in its entirety, discloses a frequency domain reflectometry (FDR) lethality assessment method and system for determining impact point and damage propagation in detection surface that utilizes frequency domain reflectometry (FDR) to determine impact point and damage propagation faults in the detection surface. The detection surface has a conductive layer capable of propagating radio frequency (RF) signals. At least one signal transmit/receive port on the detection surface injects a radio frequency (RF) interrogation signal into the detection surface and at least two signal receive-only ports on the detection surface spaced a distance apart from each other and from the signal transmit/receive port receive reflected radio frequency (RF) signals of the interrogation signal. A frequency domain reflectometry measurement system coupled with the transmit/receive port and signal receive-only ports measures frequency responses of the ports compared to predetermined baseline measurements and determines the precise location of an impact point and damage propagation fault in the detection surface by triangulation.

Kiefer et al, U.S. Pat. No. 8,307,694, assigned to Invocon, Inc., commonly owned with the present application, and incorporated herein by reference in its entirety, discloses a hyper-velocity impact detection method and system for determining the precise impact location in a detection surface, of impacts such as ballistic missile intercepts, micro-meteoroids and orbital debris (MMOD) or other shock events, that utilizes a gridless detection surface capable of propagating radio frequency (RF) impact detection signals responsive to receiving hypervelocity impacts from objects, and multiple sensors on the detection surface that directly measure radio frequency RF emissions generated by the hyper-velocity impacts on the surface, and a time of arrival (TOA) position measurement technique for determining the precise impact location in the detection surface.

Kiefer et al, U.S. Pat. No. 8,316,690, assigned to Invocon, Inc., commonly owned with the present application, and incorporated herein by reference in its entirety, discloses a hyper-velocity impact and time of arrival detection method and system for detecting hyper-velocity impacts on a detection surface utilizing multiple sensors that directly measure electrical pulse radio frequency (RF) emissions generated by hyper-velocity impacts on the detection surface and time of arrival (TOA) position measurements for determining the precise impact location on the detection surface. The detection surface material is compressed differentially in such a way that the inherent equalization of the compressed electron density in one area of the impact is directed to the uncompressed area of the material causing an electrical current that flows until the redistribution of the electrical charge has been completed and the rapid redistribution of charge and inherent current that results emits the radio frequency pulse that is induced into the detection surface.

Yet another prior art patent is U.S. Pat. No. 9,354,136 B1, issued to Brian Philpot and Doug Heerman in 2016. That patent discloses a method and system for determination of multiple shrapnel hits on a gridless target surface utilizes multiple radio frequency or acoustic emission transducers on the target surface to detect energy waves created by the impact of shrapnel on the surface that occurred at the point of initial contact and after the initial impact. Data regarding the detection, timing, and location of multiple impact events was acquired and transmitted to a remote processing location where the data was processed to determine the timing and location of all the shrapnel hits and derive final lethality information.

While the prior art methods have merit, they do not convey sufficiently the trajectory of the shrapnel hits upon the ballistic target threat. Moreover, the prior art does not provide the ability to determine accurately multiple impacts on a target per unit of time. Finally, the prior art does not determine adequately the location of those impacts on the target. There is a need, therefore, for a method or system that better determines the trajectory of the fragments, and distinguishes the number of fragments that strike the target vehicle and which of the fragments would provide the requisite damage to the threat missile.

SUMMARY OF THE INVENTION

The present invention is directed to the problem wherein a target is struck by numerous fragments from a nearby explosion. The target is instrumented with numerous sensors that respond to acoustic signals generated by the impact of the fragments. The responses of the various sensors generated by the signals are all captured by individual channels on a detection system. The present invention provides a detector that estimates the locations in time of the impacts of multiple fragments on the target by processing the individual sensor responses. A secondary goal for the present invention is to provide a detector that produces additional information about fragment impact that may be of use when the outputs of detectors from multiple sensor responses are combined to estimate fragment impact locations.

DETAILED DESCRIPTION OF THE INVENTION

Figure 1:
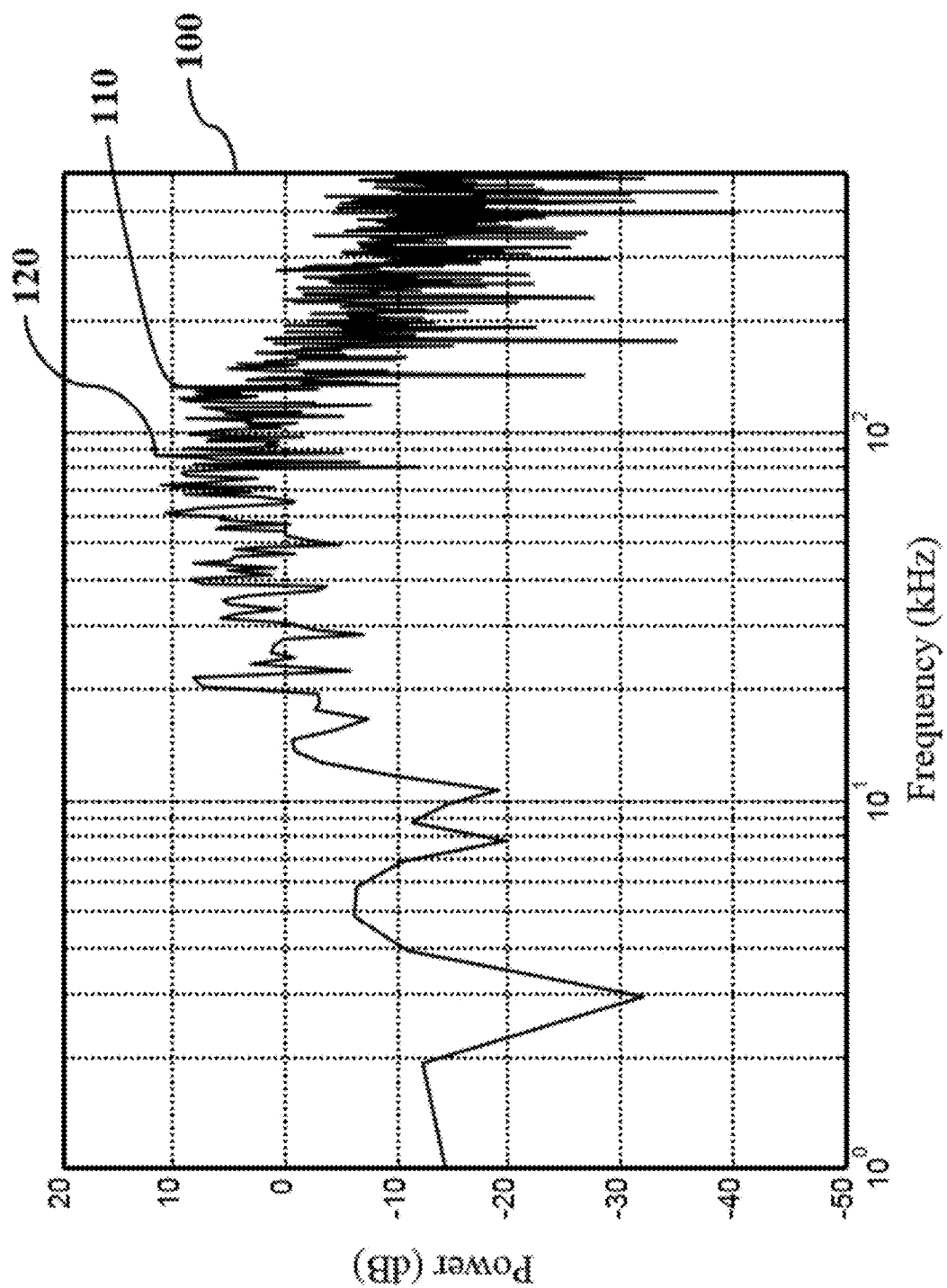
FIG. 1 illustrates a typical sensor signal power spectrum.

The detector of the present invention is in the form of a digital signal processing algorithm that operates on digital samples of sensor responses captured by, but not limited to, a WKIPS system. The detector of the present invention reliably detects fragment impacts; functions autonomously; operates on a signal serially in time; does not require multiple passes over the signal samples to produce detections; functions without customization to individual sensors; generates information about the detected impact; and is independent of input signal strength.

Description of the Detector
Theory

The model of the physics of the situation is built upon the idea of numerous fragments colliding with the target and each providing a signal due to its impact. The recorded signal is the sum of all fragment signals.

This situation can be compared to a multiuser communication problem. Each fragment's signal is an attempt by a user (fragment) to communicate to a receiver (WKIPS sensor). The receiver must then attempt to separate the fragment signals from each user from the summation signal received. In multiuser detection it is assumed that something is known about the structure of each user's signal. The received signal is captured and then the strongest user signal is estimated first with all other user signals considered noise. The resulting estimate is subtracted from the original signal and the process is repeated.

Translating this method into the problem of missile interception requires some modifications to the traditional communications technologies. The first modification is the determination of something about the signals from each fragment. This issue is solved by making the assumption that the signals generated by all fragment impacts are identical in form as the result of an impulse (the fragment-target collision and momentum exchange) and the impulse response caused by the channel between impact point to sensor to electronic conversion and final signal sample capture. This assumption is based upon observation during signal examination of numerous incoming isolated responses of impacts and concluding that they are very similar in form.

Thus, a model of the incoming signal from any sensor into the digitizing and recording equipment is assumed to be constructed of the summation of numerous impulse responses of unknown amplitude and unknown time-of-arrival. The impulse response can be estimated by examination of numerous isolated responses and creating a representative model of the impulse responses from them. This will be referred to as the model signal or, simply, the model.

The next assumption is that individual models composing the signal are separated in time. If this is not the case then there is no way to tell the difference between the summation of co-located (in time) responses from a single larger response. Given this assumption then an input signal can be processed serially where the initial arrival is estimated first then subtracted and then the process is repeated until the data is exhausted. Each model used in the subtraction process represents a single detection. The model's estimated amplitude and sign are of potential use in the eventual determination of impact location.

The power spectrum of several signals was computed and determined to be quite consistent over sensor and test. An example power spectrum is shown for the signal 110 illustrated in a graph 100 of FIG. 1.

FIG. 1 indicates a power buildup to a peak 120 at about 80 kHz with a drop in power above that frequency. The overall spectral shape of the signal 110 is wideband with no appreciable narrowband components. This is consistent with short-time-duration signals since there is an inverse relationship between the length of a signal in time and the bandwidth occupied by a signal. The power spectrum supports the hypothesis of signal composition by the summation of short waveforms.

Figure 2:
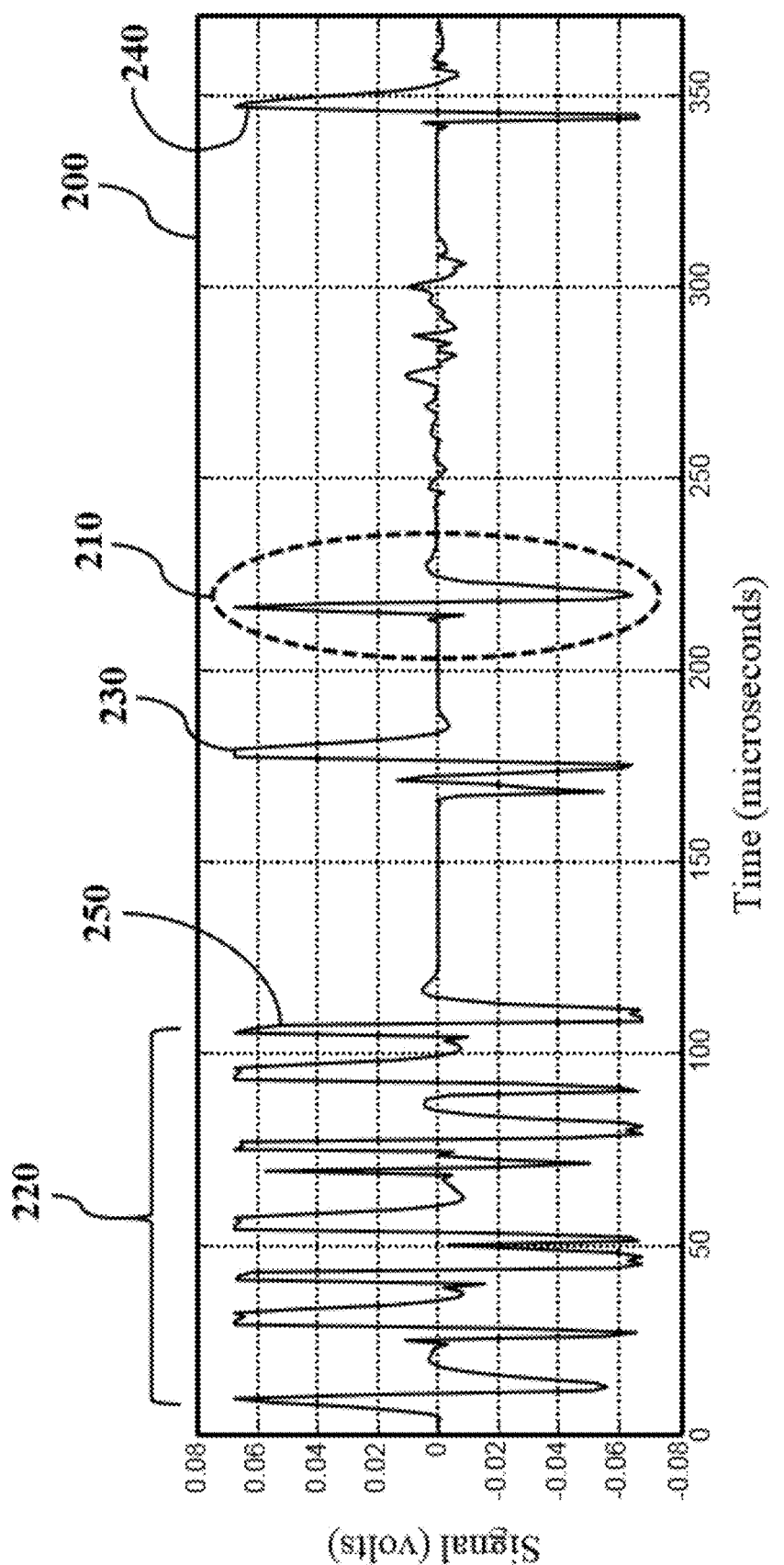
FIG. 2 illustrates a segment of a typical signal.

FIG. 2 shows a graph 200 of a short segment of a typical signal 210 (that was partially illustrated in FIG. 1). The portion of the signal that is enclosed by the ellipse 210 is hypothesized to be an elemental response resulting from a single target hit without other responses corrupting it as is done in prior portions of the signal at the region 220. It is a typical example of what is believed to be the element from which all other portions of the signal segment are composed by translations and superposition. FIG. 2 illustrates in several locations 230, 240, and 250 (for example) that this elemental response can be found isolated to some degree. That this is an elemental response is demonstrated by the lack of any signal before and after the response in the ellipse 210. A linear system responding to an input will not produce a response followed by a lack of signal and then spring back to life with another strong signal without a delay in the system (equivalently, multipath). Previous and subsequent signals must be responses to other stimuli or multipath.

The fact that numerous examples of this elemental response can be found and extracted from a wide variety of signals provides a means for estimating a model for the detection algorithm. These numerous examples of the elemental response can be extracted, scaled and averaged to develop such a model.

Inter-Sampling

The various signals that were used to create the average model differ from each other in both amplitude and in time. The sampling at 1 MHz is used to collect samples of all the models that were averaged together. There was no effort to insure that the sampling occurred at the same timing on all models. Thus, the peak of each model could occur at the location of a sample or, more likely, removed from the sample instant by some time less than the 1 microsecond sampling interval. This section looks at sampling instants by interpolating the model to sample timing at delays of ¼, ½ and ¾ of a sample time from which timing advances of ¼ and ½ of a sample time can be determined by copying ¾ and ½ waveforms placed at a 1 sample time shift.

Interpolation

The model signal was interpolated by a factor of 4 using the Matlab function interpft. The result is shown in the graph 300 in FIG. 3.

Figure 3:
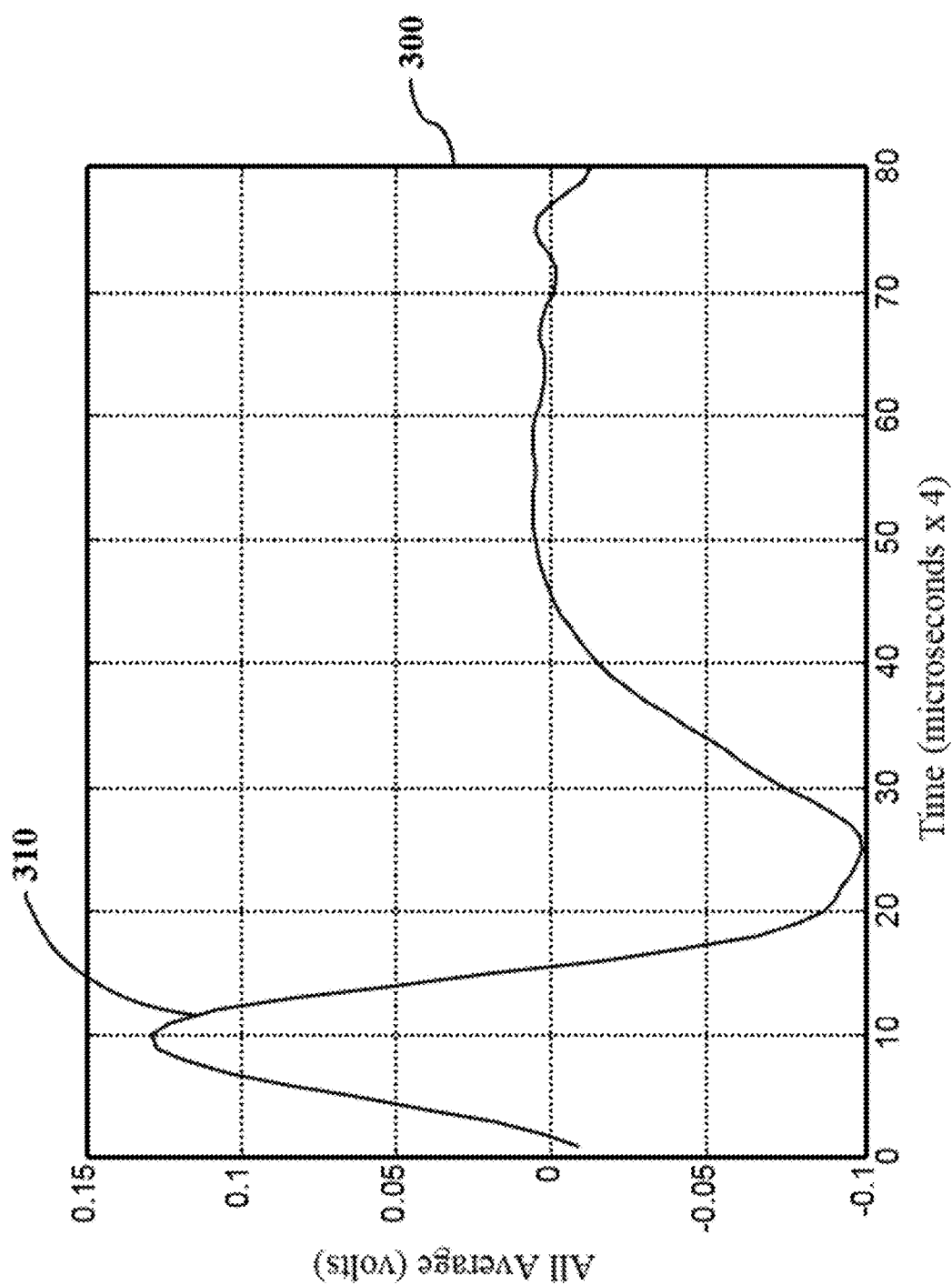
FIG. 3 illustrates the model interpolated by a factor of four.

According to graph 300 of FIG. 3, the original 20 sample model is now 80 samples long (310 in FIG. 2). The new samples are intended to be what would have been collected if the sample rate had been increased by 4 times. This is equivalent to having four sampling channels at the original sampling rate with ¼ sample time offsets. In effect the interpolated samples can be viewed as interlaced samples that can be de-interlaced to produce the set of four model signals shown in FIG. 4.

Using these extra models it is likely that a better match to the incoming signal will result since signals that are slightly time-shifted could be better correlated to one of the new models.

Figure 4:
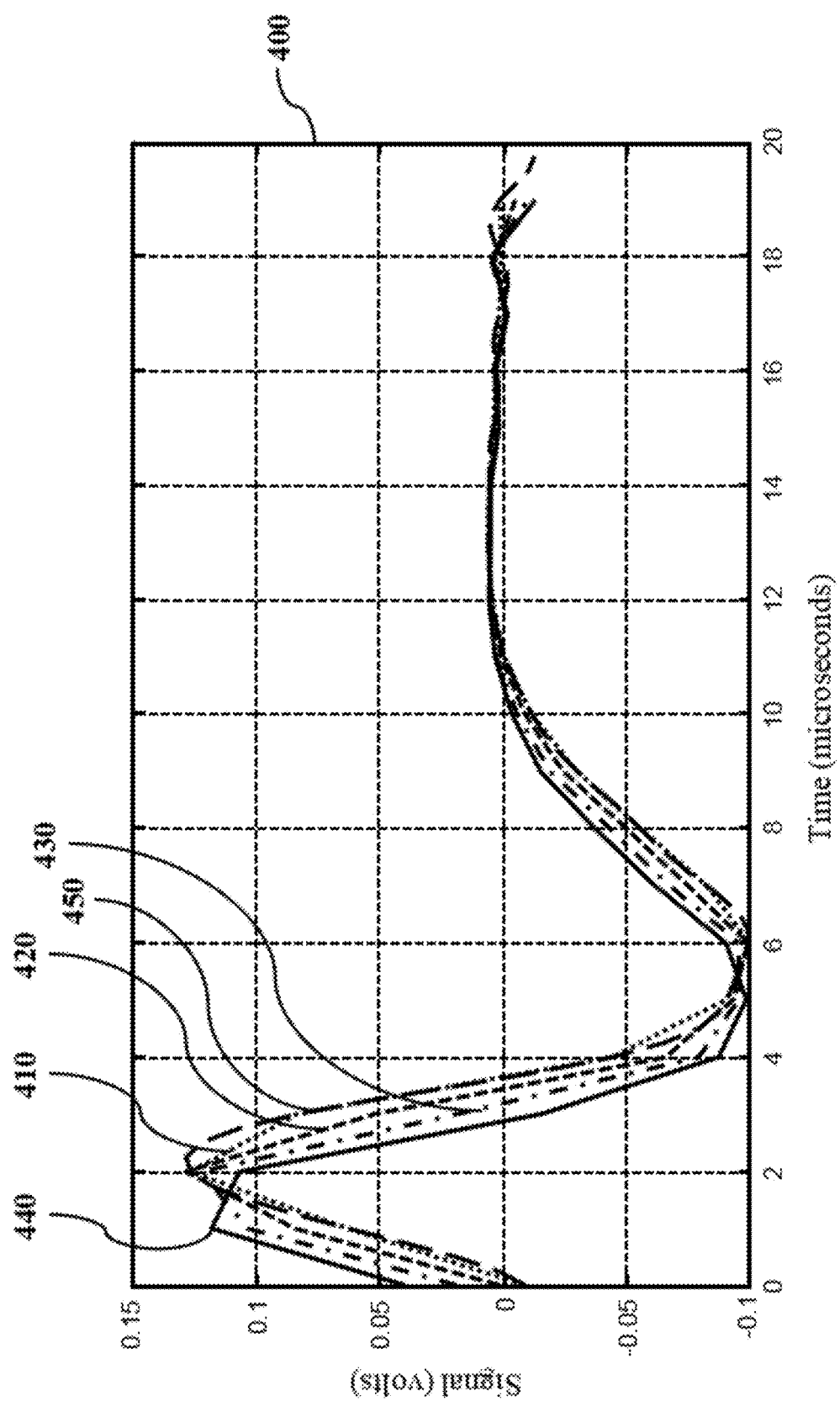
FIG. 4 illustrates an interpolated waveform creating four sub-sample-increment time-shifted models.

Close examination of the models in FIG. 4 show deviations from the original model at the right end. These deviations are due to the Gibbs Phenomenon.

Detection

A method is required by which detection decisions can be made. Normally such comparisons are done using correlation techniques where the cross correlation between two signals is divided by the square root of their variances for amplitude normalization. This can be shown as equivalent in a decision sense to computing the power of the signal differences. The cross correlation is maximum positive if the signals are identical and maximum negative if the signals merely differ in sign. All of this assumes that the detection process and signals are linear.

For the signals at hand, it is very clear that linearity cannot be assumed for the general case. The detection algorithm was designed with the operation of the entire multi-user detection approach. An input signal from a sensor is processed on a sample-by-sample basis. At each sample point, a set of input signal samples equal in number to the samples of the model are selected for comparison to the model. A means to normalize these signal samples is necessary to remove signal energy from detection decisions as much as practical. The signal samples are normalized by their largest magnitude. The model has already been normalized in a like manner.

The multi-user detector approach as applied to this problem assumes that the selected set of samples represent noise and some portion of a model-like signal having the appearance of the model except possibly for the algebraic sign. The question to answer by the detector is whether the signal is present or not and, if so, is it time-aligned to the model. Once detection is declared then the model, with proper sign, is subtracted from the input signal intending to remove the detected signal from the input signal. The process is repeated until all input samples are exhausted.

Statistic

The use of normalized signals for comparison permits the use of their cross-correlation as a sufficient statistic for making decisions by removing their relative energies from consideration. The intent is to make the model and the set of signal samples be as close as possible in amplitude without allowing energy from other following and overlapping responses in the signal to overly influence the comparison.

Figure 5:
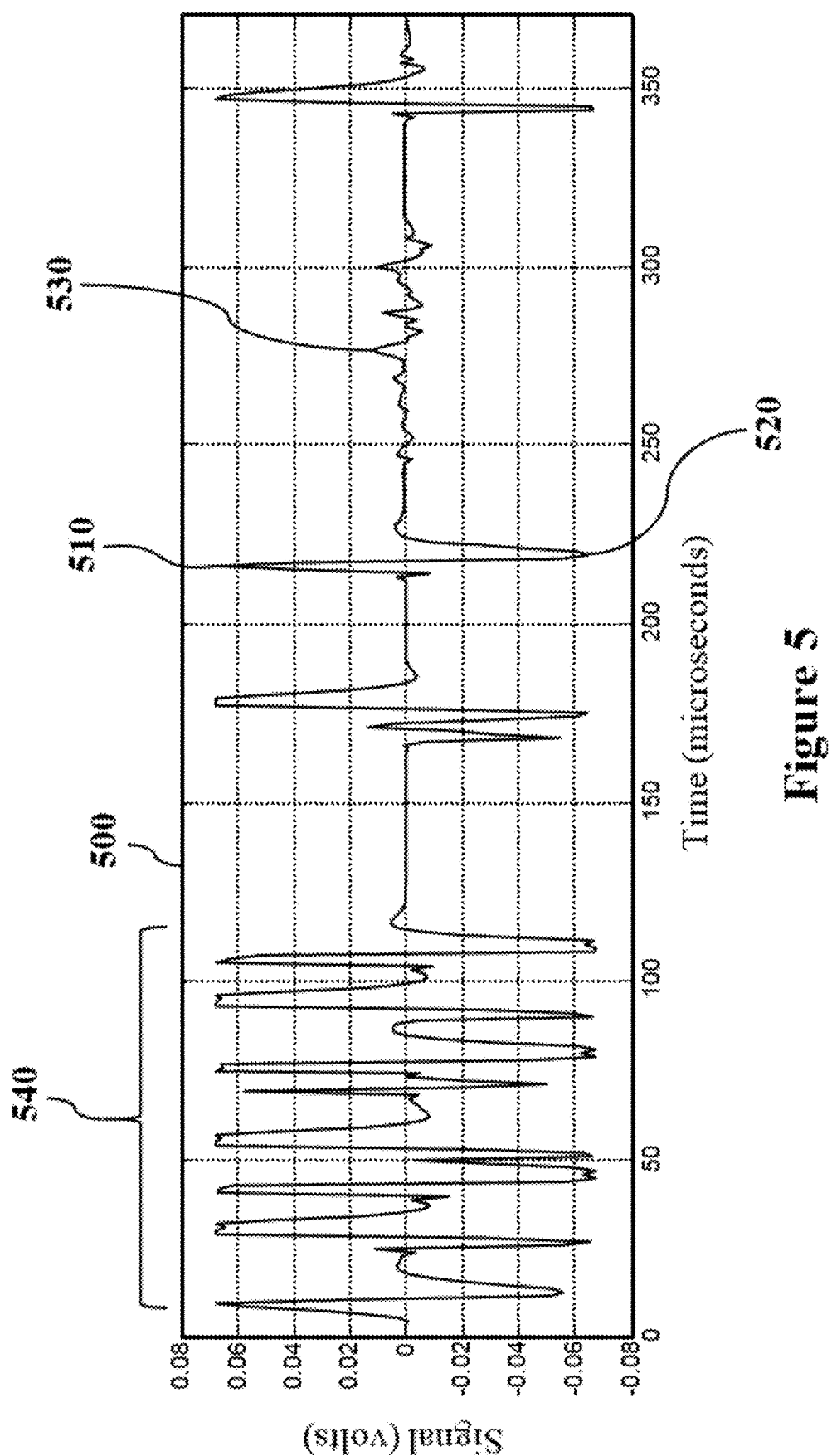
FIG. 5 illustrates a portion of a signal from a sensor.

FIG. 5 shows a portion of the signal from a test. The graph 500 illustrates how impacts generate signals from sensors. Impacts from fragments on the shells containing the sensors generate a sinusoidal-type wave (much as a pebble striking a puddle of water). This is because the body that is impacted by the fragments is elastic. Referring to FIG. 5, the plot 500 shows a timewise signal from a sensor starting at rest at time 0. The range 540 illustrates how a set of impacts causes a sinusoidal set of waves which may have resulted from two or more impacts. Similarly, a single impact may exhibit a peak 510 and a corresponding trough 520 followed by residual noise 530.

Figure 6:
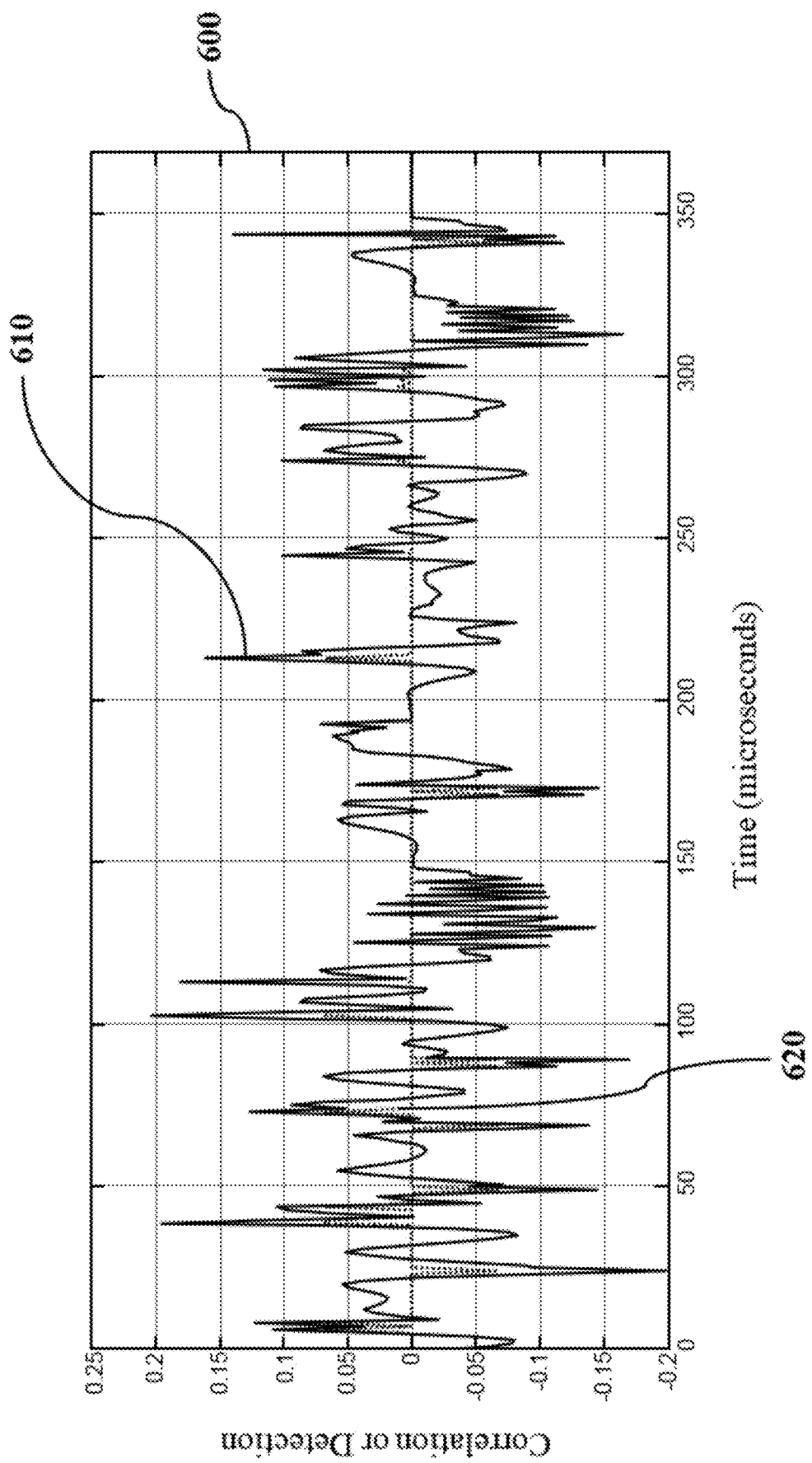
FIG. 6 illustrates a detector output for the input signal from a sensor.

FIG. 6 shows the detection statistic 600 and the detections 620 resulting from processing the input signal from the sensor. The detections 620 shown are single points (which appear as dotted lines 620 in the plot 600 of FIG. 6)

displaying the sign and the amplitude of the correlations 610 that form a model that would best explain the waveform in its coverage area.

Multipath Analysis

Figure 7:
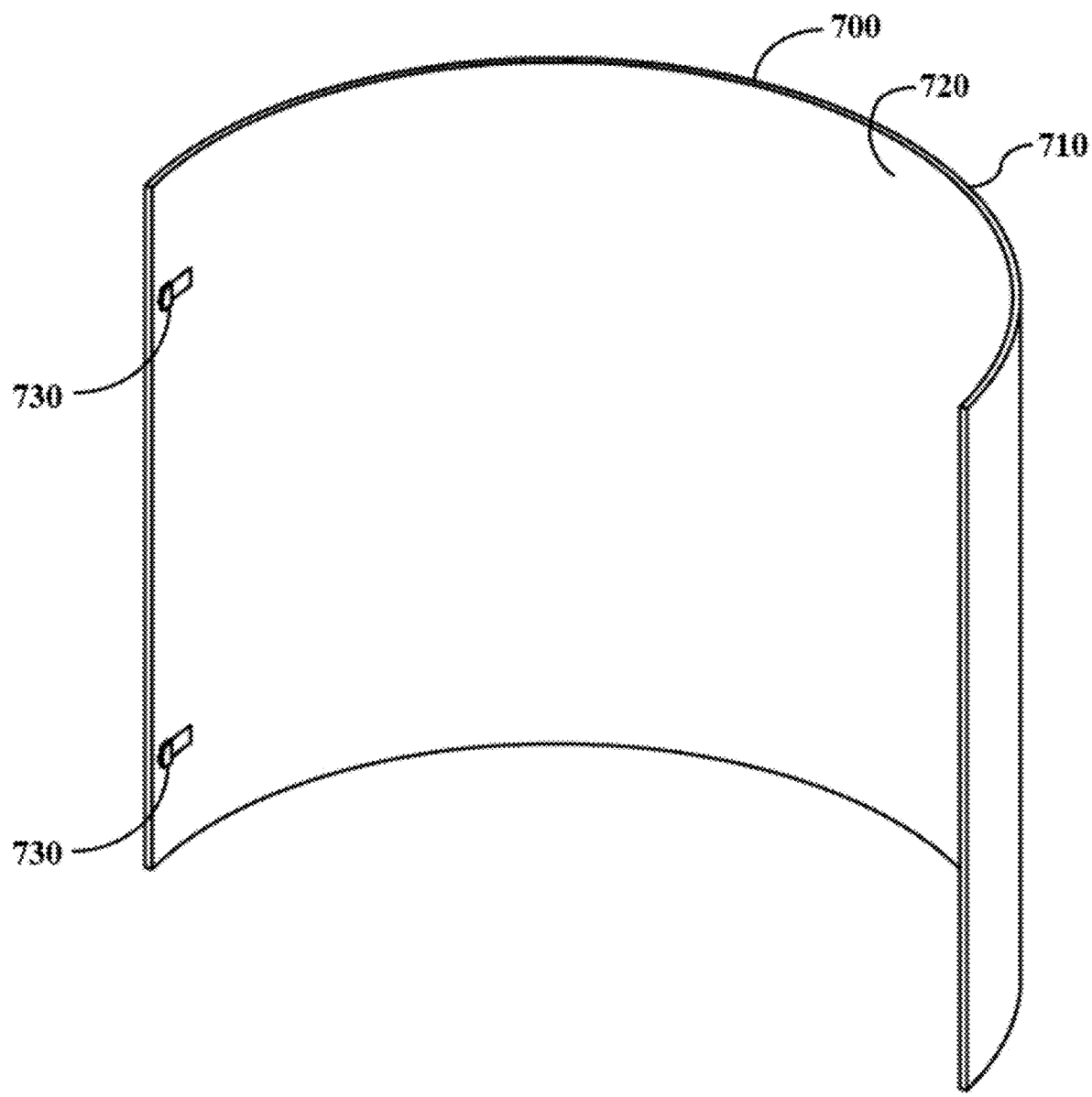
FIG. 7 is a perspective diagram illustrating the interior view of a test coupon according to the present invention.

The path mentioned in this part of the description refers to the path of the signal (waveform) generated from the impact by the projectile on the test surface, not the path of the projectile itself. The hypothesis that the recorded sensor signals are composed of numerous elemental signals, or models, can be tested using a set of data that was collected from two test coupons subjected to a series of individual rifle shots. The two test coupons were cut from a conical section of aluminum. One coupon had an exterior coating of TPS, a heat retardant material. A coupon is shown in FIG. 7. FIG. 7 illustrates a test body 700 in a semi-cylindrical shape (called a coupon) having an inner surface 720 and an outer surface 710. The coupon 700, being made of some material, will have an elasticity corresponding to the type of material making up the coupon 700. Two or more sensors 730 are attached to the inner side 720 of the coupon 700 as illustrated in FIG. 7.

Figure 8:
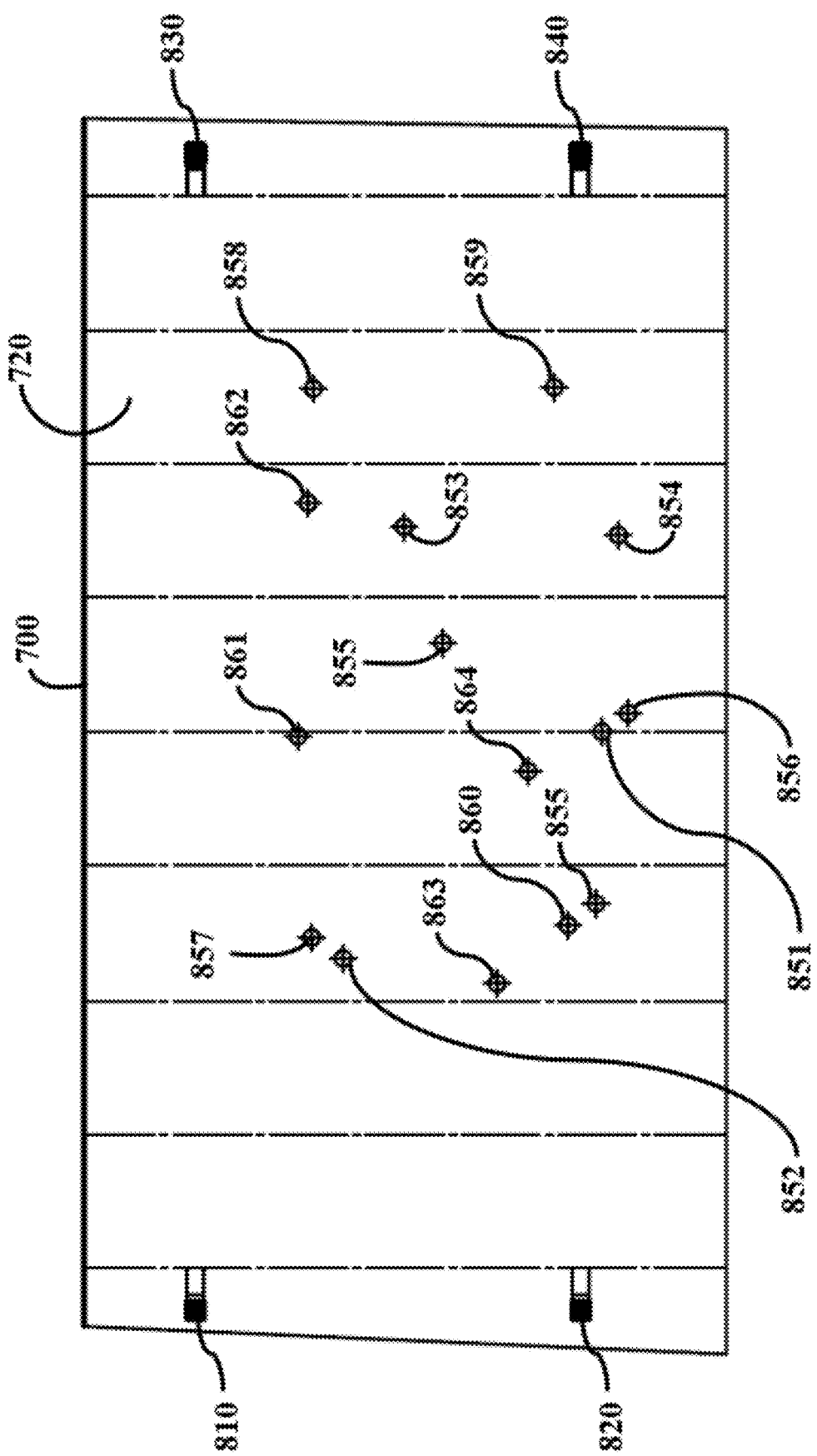
FIG. 8 is a plot illustrating a test coupon showing the locations of rifle shot hits and sensors.

The coupon 700 was hit by a rifle bullet and the responses of the sensors 730 were recorded. This procedure was then repeated for subsequent shots on one or more coupons 700. FIG. 8 shows the test coupon 700 and the hit locations 851-865 of each shot. The sketch in FIG. 8 was used to create estimates of possible multiple paths between shot and sensor locations in an attempt to explain the structure of the sensor responses to the shots. Referring to FIG. 8, the coupon 700 having an inner surface 720 is fitted with four sensors 810, 820, 830 and 840. The coupon 700 was then shot multiple times with rifle bullets to simulate fragments from an exploded missile. The bullet hits 851, 852, 853, 854, 855, 856, 857, 858, 859, 860, 861, 862, 863, 864, and 865, were made in a random pattern as illustrated in FIG. 8.

Multiple paths for acoustic signals from a shot location (e.g., 863) to a sensor (e.g. 820) require that reflections from acoustic interfaces occur. Thus, an understanding of acoustic reflections must first be gained, then a series of paths defined and measured and finally the observed signal delays must be compared to the postulated multipath delays.

Reflection Theory

When an acoustic pressure wave traveling in one medium encounters an interface to another medium then energy is transferred into the new medium and the remaining energy is reflected back into the original medium. The factors that determine the signal magnitudes, phase and the allotment of energy between transmitted and reflected waves are the density and elasticity of the mediums involved. The product of a medium's density and elasticity is the definition of the acoustic impedance of the medium.

The development of reflection and transmission relationships provided in the prior art for ultrasonic reflection produces Equation 1 for the normal incidence pressure reflection coefficient as a function of the acoustic impedances of the two mediums.

$$R = \frac{Z_2 - Z_1}{Z_2 + Z_1} \quad \text{Equation 1}$$

The acoustic impedance for aluminum is 17 and that for air is 0.0004. Using 17 for Z1 and 0.0004 for Z2 in Equation 1, it is clear that the aluminum to air interface will reflect all energy back into the aluminum (for all practical purposes) and the reflected wave will have opposite polarity relative to the incident wave.

In a plate such as the target coupon the acoustic energy spreads as cylindrical waves and the pressure (or amplitude) of the wave decreases as the reciprocal of the square root of the distance from the source.

Fragment Identification

Decoding Problem Statement

Decoding is another way of describing the parsing of the various impact-related signals from one another. The detection algorithm of the previous portion of this specification operates upon signals from the sensors of an array to create sequences of time-ordered detections. Each sensor signal is processed by the detector separately.

The problem being addressed herein is to determine the identification of fragment impacts on a target using the sequences of time-ordered detections. A fragment is identified by the time in which it is first detected by any sensor combined with the estimated location of the impact. Detections of the same fragment impact by other sensors create parts of the fragment's impact signature. Thus, for example, if a single impact should occur that creates a single detection from each sensor of an array then the detection time reported by each sensor is a component of that fragment's impact signature and the time of the first detection by any sensor combined with the location of the impact as estimated by the signature data are defined as the fragment's identification. The output of the decoder is a set of fragment identifications.

The data that is input to this problem consists of a two-dimensional array of time-ordered detection times by sensor number, the locations of the sensors within the array and the geometry of the surface to which the sensors are mounted. Within the detection-times array are signatures of multiple fragment impacts whose various components can be severely overlapped due to relative impact times and impact-to-sensor distances. Detections do not identify the fragment that caused them. Rather, multiple fragments occurring nearly simultaneously relative to the speed of acoustic signals in the medium create intertwined responses in the various sensors. Additionally, the detections themselves must be viewed as unreliable because any could be a false alarm, the result of an acoustic reflection (multipath) or the simultaneous arrival of acoustic signals from multiple fragment impacts.

The approach developed herein creates a mapping from sensor detections to fragments and provides a measure of the reliability of fragment identification.

The Application of Convolutional Encoding

Convolutional coding forces a dynamic structure to exist within coder output bits in response to a time sequence of randomized input bits. This known structure is used to advantage by a Viterbi decoder to efficiently produce maximum likelihood decoding results. The structure used in a convolutional coder is arbitrary.

The connection between convolutional coding technology and fragment identification is not obvious. The convolutional coder processes incoming data serially imposing a dynamic structure in the time domain. Fragment identification involves the random impact times of fragments and the spatial aspects of the sensor array. Impact detections are observed throughout the spatial sensor array at whatever times they occur whereas the convolutional coder produces code bits at regular time intervals. Relationships can be developed between the two when the time-based processing of a convolutional coder system is related to the time-distance processing of the fragment decoder.

Convolution and Fragment Encoding

Figure 9:
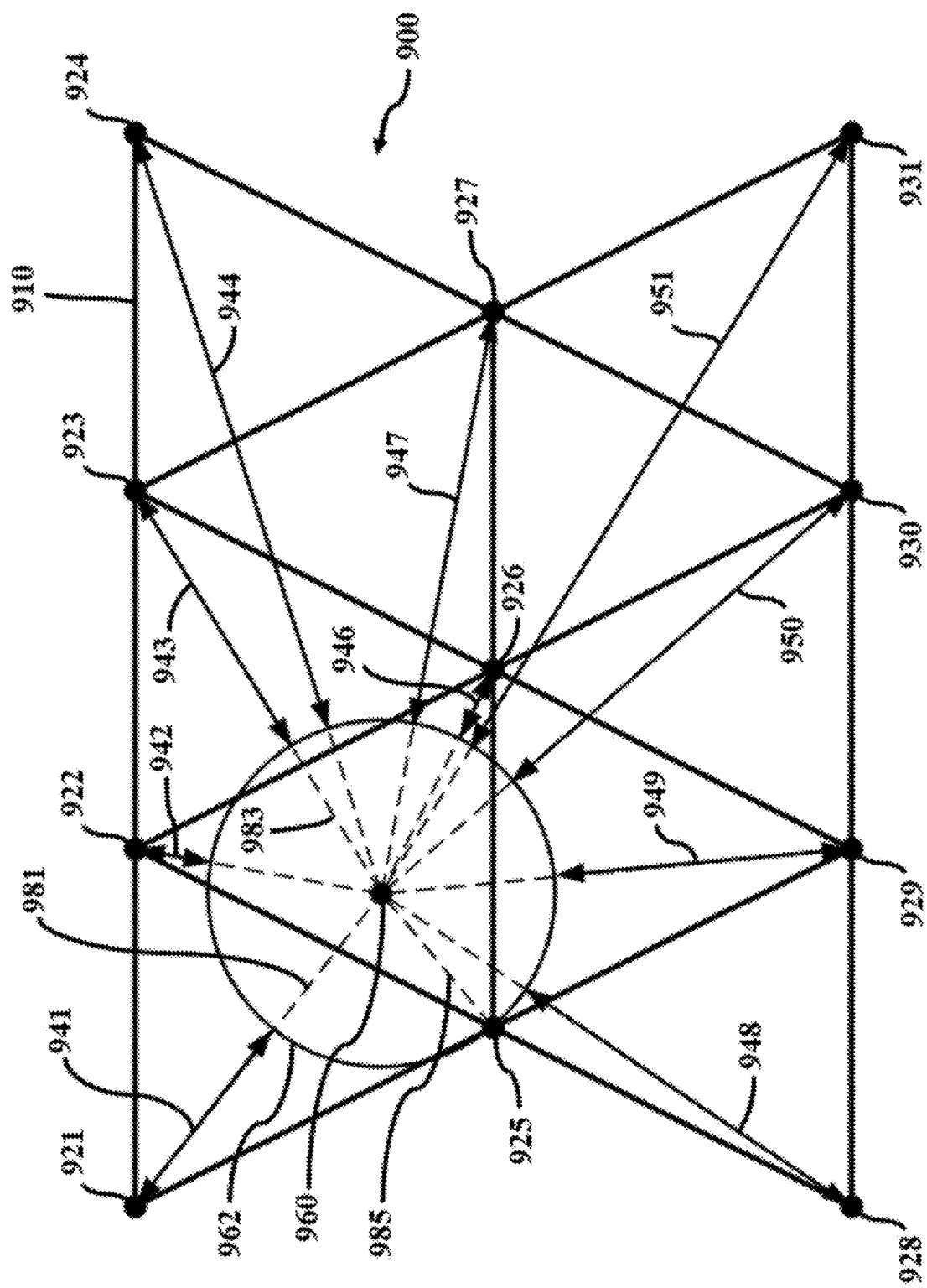
FIG. 9 illustrates a sensor array with impact and distances.

First, a structure is defined for the fragment problem that mimics the convolutional coder. The fixed structure of the fragment problem is the geometry of the spatial array of sensors. As in coding, the geometry of the array:
1. is controlled by the designer
2. is put in place prior to operation
3. remains fixed during operation
4. forces a mathematical relationship to exist between impacts and sensor signals The operation of the fragment coder can be seen in FIG. 9. FIG. 9 shows a sensor array 900 placed on a plane 910 and a single fragment impact 960 on the plane 910. The acoustic emission from the impact 960 is an impulse that radiates circularly outward from the impact point at a speed defined by the acoustic speed of the medium. The acoustic impulse arrives at each sensor 921, 922, 923, 924, 925, 926, 927, 928, 929, 930 and 931 at a time that depends directly upon the distance 941, 942, 943, 944, 945, 946, 947, 948, 949, 950, and 951, respectively between the sensor (921-931) and impact location 960. The single fragment impact (coder input) is converted by the sensor array (convolutional coder) into an output from each sensor (multiple outputs from a single input).

FIG. 9 shows the acoustic impulse by a circle 962 centered on the impact point 960 of fragment $F_1$ and at a time when the impulse arrives at a sensor, 925 in this example. The distance 961 from the impact point 960 to the closest sensor 925 is shown as 985 in FIG. 9. The travel time can be converted to distance using the speed of acoustic energy in the target material. Either time or distance can be used by employing this conversion. Distance is normally used in this application. The circle 962 indicates that the remaining distances (941, 942, 943, 944, 946, 947, 948, 949, 950, and 951) to each of the other sensors (921, 922, 923, 924, 926, 927, 928, 929, 930 and 931, respectively) is illustrated in FIG. 9. Clearly, for all sensors, Equation 2 relates the remaining distance $d_i$ to the distance $D_i$ from impact to sensor $S_i$.

$$D_i = R + d_i \quad \text{Equation 2}$$

For example, referring to FIG. 9, for the sensor 923, $D_i$ would correspond to line 943 plus 983 because $d_i$ would be 943 and R would correspond to line 983.

Figure 10:
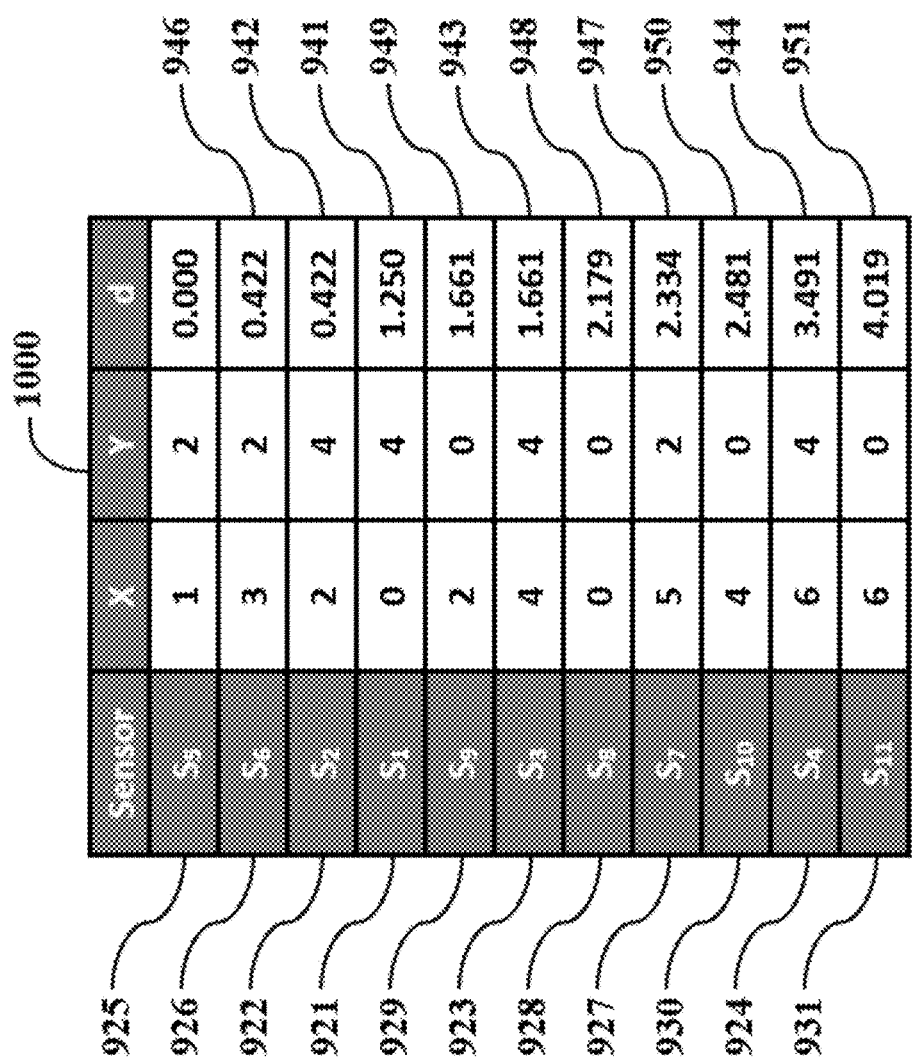
FIG. 10 is a table of measured sensor distance differences.

Detections tagged with their impulse detection times are reported by all sensors (921, 922, 923, 924, 925, 926, 927, 928, 929, 930 and 931). These detection times can be converted to distance differences by subtracting the time tag of the first detecting sensor from the time tags of all remaining sensors and then multiplying by the speed of sound in the target material. Equation 8, as illustrated by FIG. 9, shows that the distance from impact to sensor is directly and linearly related to the distance difference. The table 1000 of FIG. 10 shows, for each sensor (921, 922, 923, 924, 925, 926, 927, 928, 929, 930 and 931) each sensor's location (X and Y) and distance (d) difference as measured using the arrangement illustrated in FIG. 9. The rows of table 1000 appear in distance difference order which is also time-of-arrival difference order. This table 1000 contains all of the geometric and time information known about the impact 960 of FIG. 9. This is the encoding of the impact into distance differences related to the sensor array structure. This is the signature of an impact at 960 within this sensor array 900. Each sensor-detection combination is considered to be a state of the signature. The time-sequence of states represents a path through the states and corresponds to the acoustic energy flowing through the sensor structure arriving at sensors in order of sensor-impact distance.

There is nothing to prohibit multiple sensors from detecting at the same time, so the path can split then merge as shown twice in FIG. 10 (for sensors 929 and 923 as well as 926 and 922). The positions of sensors 926 and 922 could be exchanged as could the positions of sensors 929 and 923. What becomes clear is that the path through the states is dependent upon the given sensor geometry (coder) and the impact location (input to the coder). The state path is unique for a specific impact location and sensor geometry (ignoring splits). The speed of an acoustic emission through the medium only impacts the time scale of the detection reports.

Convolution and Fragment Decoding

Continuing with the single fragment impact example of FIG. 10, the only detections reported by each sensor would be as shown in FIG. 10 once all detection distances are referenced to the first reporting sensor's detection. Triangulation can be used with the first three sensors to report detections in order to determine the location of the impact. The first three reporting sensors are chosen because they are likely to have received signals with the highest signal-to-noise ratio and should contain the most accurate detections. Once a location is found then the value of R (see Equation 2) can be determined as the distance between the computed impact location and the closest sensor and, using the distance (d) values from the table 1000, the remaining sensor detections can be checked for geometric agreement with the computed location. In this example (a single impact), the agreement should be perfect with all sensors supporting the computed location of the fragment impact. The location is combined with the original detection value of the first detecting sensor as the identity of the fragment impact. The number of supporting sensors is a measure of the confidence to be placed in this fragment identity.

The simple coding and subsequent decoding of the example of FIG. 10 increases dramatically when additional fragment impacts occur resulting in signatures that overlap each other.

There are two failure mechanisms at play in this procedure. The first is in the triangulation algorithm where a solution may not result. The second is in the evaluation of support from other sensors.

Fragment Decisions

The decision that a candidate impact location is correctly identified can be based upon the count of the number of sensor-detections that support that hypothesis. Certainly a count of one or two does not likely produce an accurate result. Since a mathematical solution can be computed from any three sensor-detections, this location estimate has to be considered as relatively unsubstantiated. Once the count goes to four or more then the likelihood of the hypothesis increases substantially.

The count can be interpreted as representing the probability of impact detection and location. Whereas a mapping from count to probability can be nonlinear, it must be a monotonically increasing function. A threshold test can be used to make the decision that a fragment has been reliably detected. Identical detection results will occur with appropriate threshold value change using the count directly or the probabilities because of the monotonic relationship. Thus, the probability interpretation is interesting conceptually but not useful during implementation.

The decoder algorithm implementation has a Data-Directed option. Normally chosen, the Data-Directed is a feedback scheme where all states that have been decided to be part of a signature are taken out of play. If such decisions are correct then this is a significant advantage. If decisions tend to be incorrect then states are removed that could have been assigned to other correct signatures. A Data-Directed algorithm is usually a better approach if most decisions are correct but if that is not the case then the algorithm performance will degrade significantly.

The threshold used to declare an impact identity is a parameter of the algorithm.

Bounds for Computation Efficiency

This methodology causes all combinations of sensors and detections to be evaluated and that could be computationally tedious. There is a bound, however, that can be used to terminate a search without loss of generality. The Neighbor Delay Upper Bound, a special case of the Angle Bound shows that any detection difference between $S_0$ and $S_1$ or $S_0$ and $S_2$ that exceeds the distance between $S_0$ and $S_1$ or between $S_0$ and $S_2$ respectively cannot result from two first detections of the same fragment impact. Second it must be recalled that all detections are monotonically increasing so that once a detection value exceeds the distance between sensors then all subsequent detections from that sensor will also exceed that distance. A significant reduction in computation time results from employing these two facts.

Placing a Detection 'Out of Play'

The arrays are always being searched for a minimum value. When taking a sensor-detection out of play it is easily done by replacing the detection value in the array by a number that is larger than any realistic value so that the detection is never chosen. Within the software this is done with a very large number named VLN.

Triangulation Solution

Figure 11:
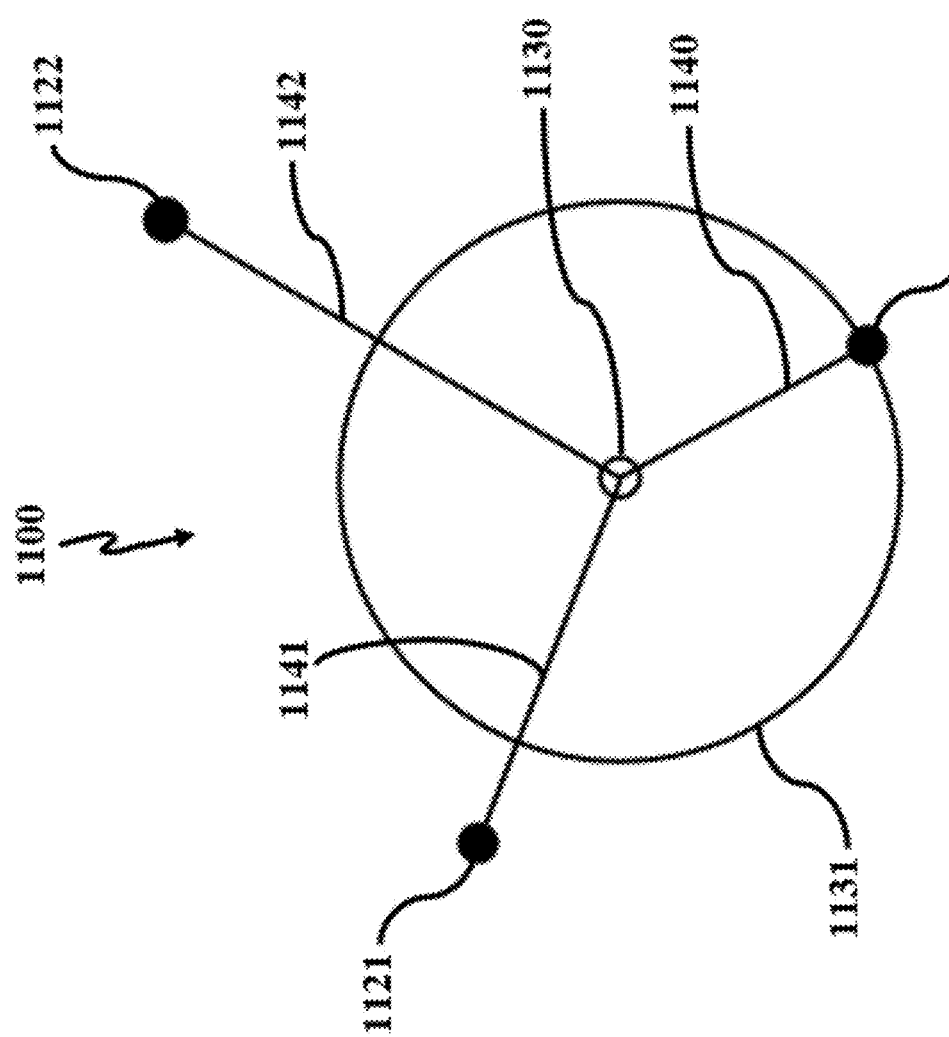
FIG. 11 is a plot illustrating a typical triangulation scenario according to the present invention.

FIG. 11 shows a typical scenario 1100 involving a fragment impact and three sensors. A fragment impact 1130 occurs at location {X,Y} causing an acoustic wave 1131 to be created that radiates outward from 1130 until it reaches the three sensors 1120, 1121 and 1122, and shown in FIG. 11. The time required for the wave to reach each sensor is related to the assumed-known acoustic speed in the target material and the distance between 1130 and each sensor 1120, 1121, and 1122.

In the scenario of FIG. 11, sensor 1120 is the first sensor that detects the acoustic wave 1131. The distance from the impact to sensor 1120 is unknown and is denoted as 1140.

Sensor 1121 is defined as the second sensor that detects the acoustic wave. If the detection times registered by sensors 1120 and 1121 are identical, then their assignments are arbitrary. The delay time between the sensor 1120 and 1121 respective detections when converted to distance using the acoustic speed is $d_1$. Thus, when the detection time is not identical, then $d_1 \geq 0$.

Sensor 1122 is defined as the third sensor that detects the acoustic wave. If the sensors 1121 and 1122 detection times are identical, then their assignments are arbitrary. The delay time between the sensor 1120 and 1122 detections when converted to distance using the acoustic speed is $d_2$. Thus, when all three detection times are not identical, then $d_2 \geq 0$.

Equation Setup

FIG. 11 can be used to write the following three equations.

$$R^2 = (X-X_0)^2 + (Y-Y_0)^2 \qquad \text{Equation 3}$$

$$(R+d_1)^2 = (X-X_1)^2 + (Y-Y_1)^2 \qquad \text{Equation 4}$$

$$(R+d_2)^2 = (X-X_2)^2 + (Y-Y_2)^2 \qquad \text{Equation 5}$$

These three equations containing three unknowns can be solved for R, X and Y using basic algebra. This solution follows along with attention to all special cases.

The first step in simultaneously solving the three equations is to expand the squared terms as shown in the following three equations.

$$R^2 = X^2 + Y^2 - 2X_0 X - 2Y_0 Y + X_0^2 + Y_0^2 \qquad \text{Equation 6}$$

$$R^2 + 2d_1 R + d_1^2 = X^2 + Y^2 - 2X_1 X - 2Y_1 Y + X_1^2 + Y_1^2 \qquad \text{Equation 7}$$

$$R^2 + 2d_2 R + d_2^2 = X^2 + Y^2 - 2X_2 X - 2Y_2 Y + X_2^2 + Y_2^2 \qquad \text{Equation 8}$$

Subtracting Equation 6 from Equation 7 and from Equation creates Equation 9 and Equation 10 that do not contain any unknowns as squared terms.

$$2d_1 R + d_1^2 = -2X_1 X - 2Y_1 Y + 2X_0 X + 2Y_0 Y + X_1^2 + Y_1^2 - X_0^2 - Y_0^2 \qquad \text{Equation 9}$$

$$2d_2 R + d_2^2 = -2X_2 X - 2Y_2 Y + 2X_0 X + 2Y_0 Y + X_2^2 + Y_2^2 - X_0^2 - Y_0^2 \qquad \text{Equation 10}$$

These equations can be rearranged as follows.

$$d_1 R = (X_0 - X_1)X + (Y_0 - Y_1)Y + \frac{X_1^2 + Y_1^2 - X_0^2 - Y_0^2 - d_1^2}{2} \qquad \text{Equation 11}$$

$$d_2 R = (X_0 - X_2)X + (Y_0 - Y_2)Y + \frac{X_2^2 + Y_2^2 - X_0^2 - Y_0^2 - d_2^2}{2} \qquad \text{Equation 12}$$

The following definitions will be used to simplify Equation 11 and Equation 12.

$$a_1 \stackrel{\Delta}{=} X_0 - X_1 \qquad \text{Equation 13}$$

$$a_2 \stackrel{\Delta}{=} Y_0 - Y_1 \qquad \text{Equation 14}$$

$$a_3 \stackrel{\Delta}{=} \frac{X_1^2 - X_0^2 + Y_1^2 - Y_0^2 - d_1^2}{2} \qquad \text{Equation 15}$$

$$b_1 \stackrel{\Delta}{=} X_0 - X_2 \qquad \text{Equation 16}$$

$$b_2 \stackrel{\Delta}{=} Y_0 - Y_2 \qquad \text{Equation 17}$$

$$b_3 \stackrel{\Delta}{=} \frac{X_2^2 - X_0^2 + Y_2^2 - Y_0^2 - d_2^2}{2} \qquad \text{Equation 18}$$

Using these definitions Equation 11 and Equation 12 become Equation 19 and Equation 20.

$$d_1 R = a_1 X + a_2 Y + a_3 \qquad \text{Equation 19}$$

$$d_2 R = b_1 X + b_2 Y + b_3 \qquad \text{Equation 20}$$

Solution Cases

In the development of a general solution there are several geometric conditions that can result in zero divisors. Since dividing by zero will result in a failure of the solution, tests must be performed that will cause different approaches in those instances. Geometric conditions that require special attention are generally when the three sensors lie on the same straight line and specifically when the line is horizontal, vertical or at some other angle relative to the coordinate system.

Whenever three points lie on a straight line in a plane then the slope of the line must be the same between these points. Then Equation 21 will hold.

$$\frac{Y_0 - Y_1}{X_0 - X_1} = \frac{Y_0 - Y_2}{X_0 - X_2} \qquad \text{Equation 21}$$

Using the above definitions, Equation 21 can be written as Equation 22.

$$\frac{a_2}{a_1} = \frac{b_2}{b_1} \quad \text{Equation 22}$$

Rearranging Equation 22 produces Equation 23.

$$a_1 b_2 - a_2 b_1 = 0 \quad \text{Equation 23}$$

In the development the following definition will be useful.

$$abd \triangleq a_1 b_2 - a_2 b_1 \quad \text{Equation 24}$$

Thus, this equation can be used to test for a linear sensor array. A linear sensor array is important because it provides one-dimensional information to a two-dimensional problem and, as such, a single solution will not be possible. It is additionally important because this situation can be avoided by proper sensor array design that insures that no three sensors lie on a common straight line when the surface is rolled onto a plane or by software that checks for a linear relationship between sensors before trying to solve a location problem.

Other embodiments of the present invention will be apparent to those skilled in the art upon reading this specification and the related claims.

What is claimed is:

1. A method of determining the number and path of one or more fragments hitting an object, the method comprising:
   providing three or more sensors on the object, each of the three or more sensors constructed and arranged to measure disruption to the object at one or more locations on the object corresponding to the one or more fragments hitting the object, each of the sensors further constructed and arranged to transmit one or more signals upon impact of the one or more fragments on the object;
   providing a computer system, the computer system constructed and arranged to receive the one or more signals from the one or more sensors, the computer system further constructed and arranged to determine the location of the one or more fragment hits on the object;
   detecting a first hit by a first fragment on the object by the three or more of the sensors, the three or more sensors sending a first set of signals to the computer system;
   determining, by the computer system, a location of the first hit by the first fragment on the object based upon the first set of signals sent by the three or more sensors; and
   detecting a second hit by a second fragment on the object by the three or more sensors, the three or more sensors sending a second set of signals to the computer system corresponding to the second hit by the second fragment;
   wherein if the signals from the three or more sensors from the second impact have superimposed data from the first hit by the first fragment and, then subtracting that portion of the second signal information corresponding to the first hit so that the location of the second hit can be determined.

2. The method of claim 1, wherein the step of determining the location of a hit by a fragment on the object includes multilateration.

3. The method of claim 1, further including providing a model of the characteristics of a hit by a fragment on the object.

4. The method of claim 3, wherein the model is used to help subtract the information corresponding to the first hit by the first fragment from the information corresponding to the second hit by the second fragment.

5. The method of claim 1, wherein the object is composed of a material, the material of the object having an acoustic impedance.

6. The method of claim 5, wherein the three or more sensors measure the acoustic impedance of the material of the object.

7. The method of claim 5, wherein the acoustic impedance of the object is used by the computer system, in conjunction with the first set of signals from the three or more sensors, to determine the time that the first fragment hits the object.

8. The method of claim 7, wherein the step of determining the location of the second fragment to hit the object utilizes the time that the first fragment hits the object.

9. A method of determining the number and path of one or more fragments hitting an object, the object being composed of a material having a known acoustic impedance, the method comprising:
   providing three or more sensors on the object, each of the three or more sensors constructed and arranged to measure the acoustic impedance of the material of the object, the three or more sensors further constructed and arranged to measure disruption to the object at one or more locations on the object corresponding to the one or more fragments hitting the object, each of the sensors further constructed and arranged to transmit one or more signals corresponding to changes in the acoustic impedance of the material of the object upon impact of the one or more fragments on the object;
   providing a computer system, the computer system constructed and arranged to receive the one or more signals from the one or more sensors, the computer system further constructed and arranged to determine the location of the one or more fragment hits on the object;
   detecting a first hit by a first fragment on the object by the three or more of the sensors, the three or more sensors sending a first set of signals to the computer system;
   determining, by the computer system, a location of the first hit by the first fragment on the object based upon the first set of signals sent by the three or more sensors; and
   detecting a second hit by a second fragment on the object by the three or more sensors, the three or more sensors sending a second set of signals to the computer system corresponding to the second hit by the second fragment;
   wherein if the signals from the three or more sensors from the second impact have superimposed data from the first hit by the first fragment and, then subtracting that portion of the second signal information corresponding to the first hit so that the location of the second hit can be determined.

10. A method of determining the number and path of one or more fragments hitting an object, the object being composed of a material having a known acoustic impedance, the method comprising:
    providing a set of one or more models of an acoustic impedance profile of a fragment impacting the object;
    providing three or more sensors on the object, each of the three or more sensors constructed and arranged to measure disruption to the object at one or more locations on the object corresponding to the one or more fragments hitting the object, each of the sensors further constructed and arranged to transmit one or more signals upon impact of the one or more fragments on the object;

providing a computer system, the computer system constructed and arranged to receive the one or more signals from the one or more sensors, the computer system further constructed and arranged to determine the location of the one or more fragment hits on the object;

detecting a first hit by a first fragment on the object by the three or more of the sensors, the three or more sensors sending a first set of signals to the computer system;

determining, by the computer system using the set of one or more models, a location of the first hit by the first fragment on the object based upon the first set of signals sent by the three or more sensors; and detecting a second hit by a second fragment on the object by the three or more sensors, the three or more sensors sending a second set of signals to the computer system corresponding to the second hit by the second fragment;

wherein if the signals from the three or more sensors from the second impact have superimposed data from the first hit by the first fragment and, then subtracting that portion of the second signal information corresponding to the first hit so that the location of the second hit can be determined.

* * * * *